United States Patent [19]

Inden et al.

[11] Patent Number: 4,515,345
[45] Date of Patent: May 7, 1985

[54] SOLENOID VALVE

[75] Inventors: Masahiro Inden; Kazutaka Kuwana, both of Toyota, Japan

[73] Assignee: Aisin Seiki Kabushiki Kaisha, Kariya, Japan

[21] Appl. No.: 545,978

[22] Filed: Oct. 27, 1983

[30] Foreign Application Priority Data

Oct. 27, 1982 [JP] Japan .................. 57-162807[U]

[51] Int. Cl.³ .................. F16K 31/02; H01F 3/00
[52] U.S. Cl. .................. 251/141; 335/260
[58] Field of Search .................. 251/129, 141, 139; 335/260, 262, 255

[56] References Cited

U.S. PATENT DOCUMENTS 2,449,438 9/1948 Wisegarver .................. 335/260
3,420,260 1/1969 Wisneiwski .................. 251/149

Primary Examiner—Samuel Scott
Assistant Examiner—G. Anderson
Attorney, Agent, or Firm—Sughrue, Mion, Zinn, Macpeak and Seas

[57] ABSTRACT

A solenoid valve used in a positive pressure has a yoke divided into two portions around the housing. A flange surface is formed on one end of the bobbin of the valve and is directly attached to a chassis. The flange surface and the valve seat of the solenoid valve are molded integrally with the bobbin.

3 Claims, 2 Drawing Figures

SOLENOID VALVE

FIELD OF THE INVENTION

The present invention relates to a solenoid valve and, more particularly, to a solenoid valve used under a positive pressure.

BACKGROUND OF THE INVENTION

In a conventionally employed detachable solenoid valve unit for use under a positive pressure, the valve seat is formed by a metal plate which is brazed or welded to the housing. The metal plate also forms a flange surface to mount the valve unit. Therefore, this solenoid valve is heavy and occupies a large space.

SUMMARY OF THE INVENTION

It is the main object of the present invention to provide a small-sized and lightweight solenoid valve which is composed of a small number of components.

This object is achieved, in accordance with the present invention, by molding a valve seat and a flange integrally with a bobbin.

It is another object of the invention to provide a solenoid valve which can be manufactured to a closer dimensional tolerance and which has a smaller air gap and hence can produce a larger attractive force.

In one feature of the invention, the yoke of a solenoid valve is divided into a plurality of sections, and the valve seat and the flange are molded integrally with a bobbin.

In another feature of the invention, the bobbin, the portion along which the plunger slides, the valve seat, and the flange of a solenoid valve are intergrally molded.

Other objects and features of the invention will appear in the course of the description of the invention which is taken in conjunction with the accompanying drawing.

DETAILED DESCRIPTION OF THE INVENTION

Figure 1:
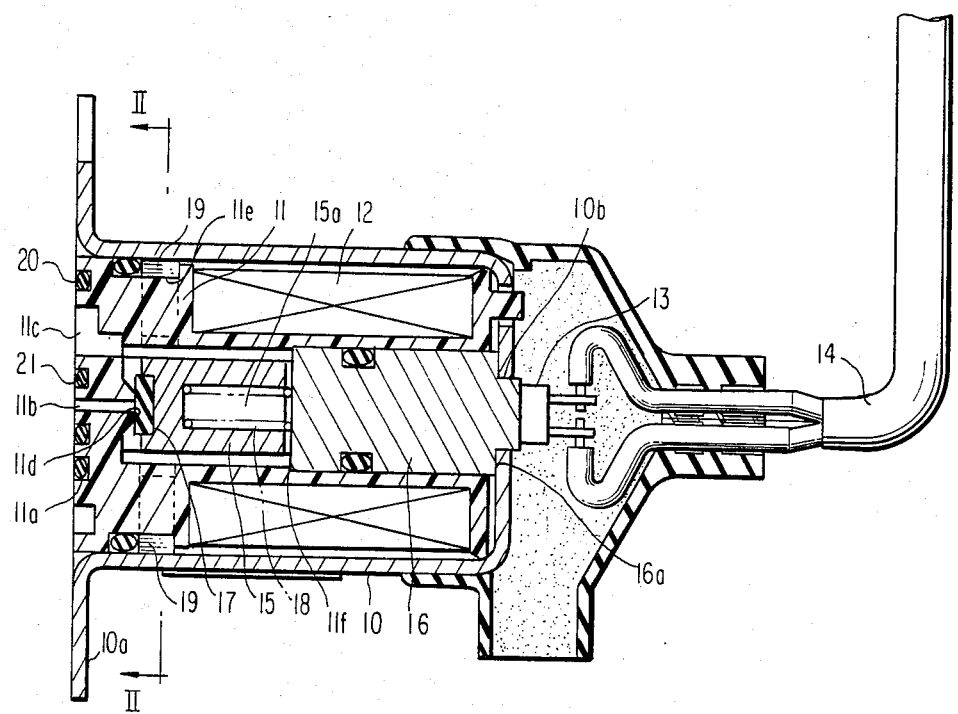
FIG. 1 is a cross-sectional view of a solenoid valve according to the present invention.
Figure 2:
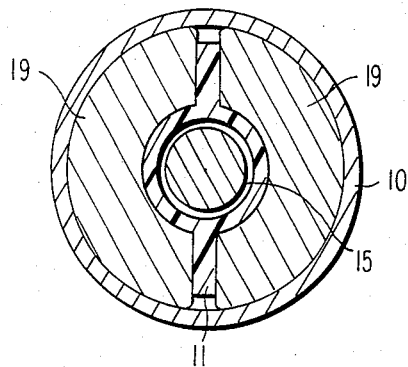
FIG. 2 is a cross-sectional view taken on the line II—II of FIG. 1.

Referring to the drawing, there is shown a solenoid valve embodying the concept of the present invention. The housing 10 of the valve has a mounting flange 10a so that the valve may be mounted to a chassis (not shown) with a bolt (not shown). A bobbin 11 having a coil 12 wound thereon is disposed in the housing 10. The ends of the coil 12 are connected to a cord 14 via an eyelet 13.

Installed in the bobbin 11 are a plunger 15 and a core 16, between which a coiled spring 18 is disposed. In particular, the plunger 15 is provided with a recess 15a in which the spring 18 is received. The plunger 15 has one end to which a valve 17 is welded. One end of the core 16 has a reduced portion 16a fitted in a hole 10b formed in the housing 10. The bobbin 11 has a stopper 11f that supports the other end of the core 16.

An end flange 11a is formed at one end of the bobbin 11, and a first passage 11b and a second passage 11c extend through the end flange. Formed between these passages 11b and 11c is a valve seat 11d on which the valve 17 can abut. The bobbin 11 is provided with a pair of grooves 11e to anchor a pair of yokes 19.

The solenoid valve constructed as described above is mounted to the chassis (not shown) by directly attaching the flange 11a to the housing after mounting seal rings 20 and 21.

In the novel solenoid valve, the valve seat and the flange are molded integrally with the bobbin. Consequently, the valve is lighter in weight and has a less number of components than conventional solenoid valves. In addition, since the bobbin, the portion along which the plunger slides, the valve seat, and the flange can be molded integrally, the solenoid valve can be fabricated to a closer dimensional tolerance. Furthermore, the air gap can be made smaller, resulting in an increase of the attractive force.

While a preferred embodiment of the invention has been described using specific terms, such description is for illustrative purposes only, and it is to be understood that various changes and variations may be made without departing from the spirit and scope of the following claims.

What is claimed is:

1. In a solenoid valve comprising:
   a cup-shaped housing,
   a bobbin disposed in the housing and having a coil wound thereon,
   a core firmly fixed in the bobbin,
   a plunger provided with a valve at one end thereof moveably disposed in said housing,
   a flange on one end of said bobbin and having a valve seat disposed so as to be opposite to the valve of the plunger,
   a spring biasing the plunger in such a direction as to abut on the valve seat, and
   a yoke disposed intermediate said coil and said flange to couple the housing to the plunger magnetically,
   the improvement wherein said yoke is divided into a plurality of sections substantially surrounding said bobbin, and wherein said valve seat and said flange are molded integrally with said bobbin.

2. In a solenoid valve as set forth in claim 1, the further improvement wherein one end of said core is provided with a reduced portion fitted in a hole formed in the housing, the other end of the core abutting on a stopper formed on the bobbin.

3. In a solenoid valve as set forth in claim 1, the further improvement wherein said plunger is provided with a recess in which said spring is received.

* * * * *